United States Patent
Deutmeyer et al.

(10) Patent No.: US 9,118,882 B2
(45) Date of Patent: Aug. 25, 2015

(54) UPDATING INFORMATION IN TIME-SHIFTED MULTIMEDIA CONTENT

(75) Inventors: Hans J. Deutmeyer, New York, NY (US); Craig D. Cuttner, Norwalk, CT (US)

(73) Assignee: Home Box Office, Inc., New York, NY (US)

( * ) Notice: Subject to any disclaimer, the term of this patent is extended or adjusted under 35 U.S.C. 154(b) by 2636 days.

(21) Appl. No.: 11/052,265

(22) Filed: Feb. 7, 2005

(65) Prior Publication Data

US 2006/0177200 A1 Aug. 10, 2006

(51) Int. Cl.
| | |
|---|---|
| H04N 5/76 | (2006.01) |
| H04N 21/44 | (2011.01) |
| H04N 21/234 | (2011.01) |
| H04N 5/781 | (2006.01) |
| H04N 9/804 | (2006.01) |

(52) U.S. Cl.
CPC .......... *H04N 5/76* (2013.01); *H04N 21/23424* (2013.01); *H04N 21/44016* (2013.01); *H04N 5/781* (2013.01); *H04N 9/8045* (2013.01)

(58) Field of Classification Search
CPC ....... H04N 5/76; H04N 5/781; H04N 9/8045; H04N 21/23424; H04N 21/44016
USPC ............... 725/32–36; 386/125–126
See application file for complete search history.

(56) References Cited

U.S. PATENT DOCUMENTS

| | | | | |
|---|---|---|---|---|
| 5,818,510 | A | * | 10/1998 | Cobbley et al. ............... 725/139 |
| 6,029,045 | A | * | 2/2000 | Picco et al. ..................... 725/34 |
| 7,039,933 | B1 | * | 5/2006 | Chen et al. ....................... 725/36 |
| 7,200,852 | B1 | * | 4/2007 | Block .............................. 725/34 |
| 7,870,589 | B2 | * | 1/2011 | Ducheneaut et al. ........... 725/34 |
| 2002/0065678 | A1 | * | 5/2002 | Peliotis et al. .................... 705/1 |

(Continued)

FOREIGN PATENT DOCUMENTS

| | | | |
|---|---|---|---|
| EP | 1 379 083 A2 | 1/2004 | ............... H04N 5/85 |
| GB | 2 394 615 A | 4/2004 | ............ H04N 5/782 |
| WO | WO03010965 A1 * | 2/2003 | |

OTHER PUBLICATIONS

Japanese Office Action; Mailed Mar. 28, 2011 for corresponding Japanese Application No. 2007-554123 filed on Jan. 23, 2006.

(Continued)

*Primary Examiner* — Randy Flynn
(74) *Attorney, Agent, or Firm* — Mendelsohn, Drucker & Dunleavy, P.C.; Edward J. Meisarosh; Steve Mendelsohn

(57) ABSTRACT

A method and apparatus updates supplement information (SI) in a time-shifted multimedia program that includes a primary multimedia-content feed and one or more SI overlays. In one embodiment, the invention identifies spatial, temporal, and/or logical occurrences of supplemental information (SI) in a recorded program and replaces this potentially outdated information with SI that is either less time-sensitive and/or updated to be relevant to the playback time of the program. In another embodiment, SI overlays are identified by tags that are embedded into a multimedia program feed and stored (time-shifted) along with the feed by an enhanced digital video recorder (EDVR) set-top. The set-top decodes the stored feed, reads the tags to determine sources for replacement SI, retrieves the replacement SI from the sources, and creates updated overlays from the replacement SI. The set-top then replaces the original overlays with updated SI overlays and outputs the result to a display.

5 Claims, 6 Drawing Sheets

(56) References Cited

U.S. PATENT DOCUMENTS

| | | | |
|---|---|---|---|
| 2002/0138831 A1* | 9/2002 | Wachtfogel et al. | 725/32 |
| 2002/0178447 A1 | 11/2002 | Plotnick et al. | 725/36 |
| 2003/0039465 A1* | 2/2003 | Bjorgan et al. | 386/20 |
| 2003/0046690 A1* | 3/2003 | Miller | 725/36 |
| 2003/0066078 A1 | 4/2003 | Bjorgan et al. | 725/34 |
| 2003/0120541 A1* | 6/2003 | Siann et al. | 725/32 |
| 2004/0003406 A1* | 1/2004 | Billmaier | 725/60 |
| 2004/0143843 A1* | 7/2004 | Khoo et al. | 725/34 |
| 2004/0244035 A1* | 12/2004 | Wright et al. | 725/32 |
| 2005/0028193 A1* | 2/2005 | Candelore et al. | 725/135 |
| 2005/0060759 A1 | 3/2005 | Rowe et al. | 725/143 |
| 2005/0193425 A1* | 9/2005 | Sull et al. | 725/135 |
| 2006/0174313 A1* | 8/2006 | Ducheneaut et al. | 725/135 |

OTHER PUBLICATIONS

Examination Report; Mailed Feb. 14, 2012 for corresponding European Application No. EP 06 719 090.0.

European Office Action; Received Nov. 12, 2014 for corresponding European Application No. EP 06 719 090.0.

* cited by examiner

US 9,118,882 B2

UPDATING INFORMATION IN TIME-SHIFTED MULTIMEDIA CONTENT

BACKGROUND OF THE INVENTION

1. Field of the Invention

The present invention relates to multimedia content management, and, more specifically, to updating information fields that are included in multimedia content that has been time-shifted.

2. Description of the Related Art

Supplemental Information

Many multimedia content providers (e.g., cable companies, studios, or broadcasters) provide supplementary information (e.g., commercials, advertisements, or horizontally scrolling or crawling sports scores or stock quotes) to their viewers in addition to a primary multimedia-content feed (e.g., video). These supplementary information (SI) feeds are provided in a number of different ways.

In some cases, information is converted to a graphical form and superimposed onto video during a production process (e.g., at a studio). In other cases, text is overlaid on the video in real time at a distribution point (e.g., a local cable headend) or the point of display (e.g., a set-top box or personal computer) via a local character generator, keying/compositing unit, or via a windowing process. In these cases, the supplementary information is spatially differentiated from the primary multimedia-content feed. In other words, there is a spatial location within the video image where the SI can be found.

In other cases (e.g., commercials), supplementary information is inserted within the primary multimedia-content feed at specific intervals in time. In these cases, supplementary information is temporally differentiated from the primary multimedia-content feed.

Finally, multimedia content comes in all sorts of different packages and transports (e.g., an MPEG-2 program including a video packet identifier (PID) and multiple audio/data PIDs). A package or transport can include both a primary multimedia-content feed (e.g., carried in the video and primary audio PIDs of an MPEG-2 program) as well as logically differentiated SI feeds (e.g., carried in one or more of the data PIDs of an MPEG-2 program).

Time Sensitivity

Often, supplementary information is somewhat time sensitive. For example, on a sports channel whose primary multimedia-content feed is a playoff game, information may be scrolling across the bottom of the screen that provides, for example, quarter-hour updates on the scores of other games in the league, reports on sports injuries, or other time-sensitive events. Similarly, national networks typically provide regular time slots within their programs, within which local affiliate stations can insert local commercials. These commercials can sometimes be time sensitive (e.g., advertisements stating "one time only" or "call within the next 24 hours to receive your free bonus gift," or local news program advertisements stating "full story at 11 PM"). Finally, packaged SI (e.g., poll results) provided in an intercast-type (e.g., vertical blanking interval (VBI) feed within a broadcast channel) can also be time sensitive.

However, real-time and/or time-sensitive supplemental information can become stale and/or irrelevant when a program (e.g., a primary multimedia-content feed and its associated SI) is time-shifted for later playback. Time-shifting can occur during the multimedia content distribution process (e.g., the 3-hour delay that a West Coast airing of a prime-time program sometimes receives relative to the program's East Coast airing time), but increasingly, the growing popularity and use of digital video recorders (DVRs) by consumers means that, more and more, programs are delayed by a PC or STB in a consumer's home by some indeterminate amount of time before they are played back. When a recorded program is finally viewed, the associated supplemental information can be stale or irrelevant, depending on how long it has been since the program was recorded.

SUMMARY OF THE INVENTION

Problems in the prior art are addressed in accordance with principles of the present invention by a method and apparatus that updates supplement information in a program based on the playback time of the program. In one embodiment, the invention identifies spatial, temporal, or logical occurrences of supplemental information (SI) in a recorded program and replaces this potentially outdated information with SI that is either less time-sensitive and/or updated to be relevant to the playback time of the program.

According to one embodiment, at a recording time, multimedia content comprising first original supplemental information (SI) is recorded. At a playback time, the recorded multimedia content is retrieved, the first original SI is replaced with first replacement SI in the multimedia content, and the multimedia content comprising the first replacement SI is presented.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Introduction

Figure 1:
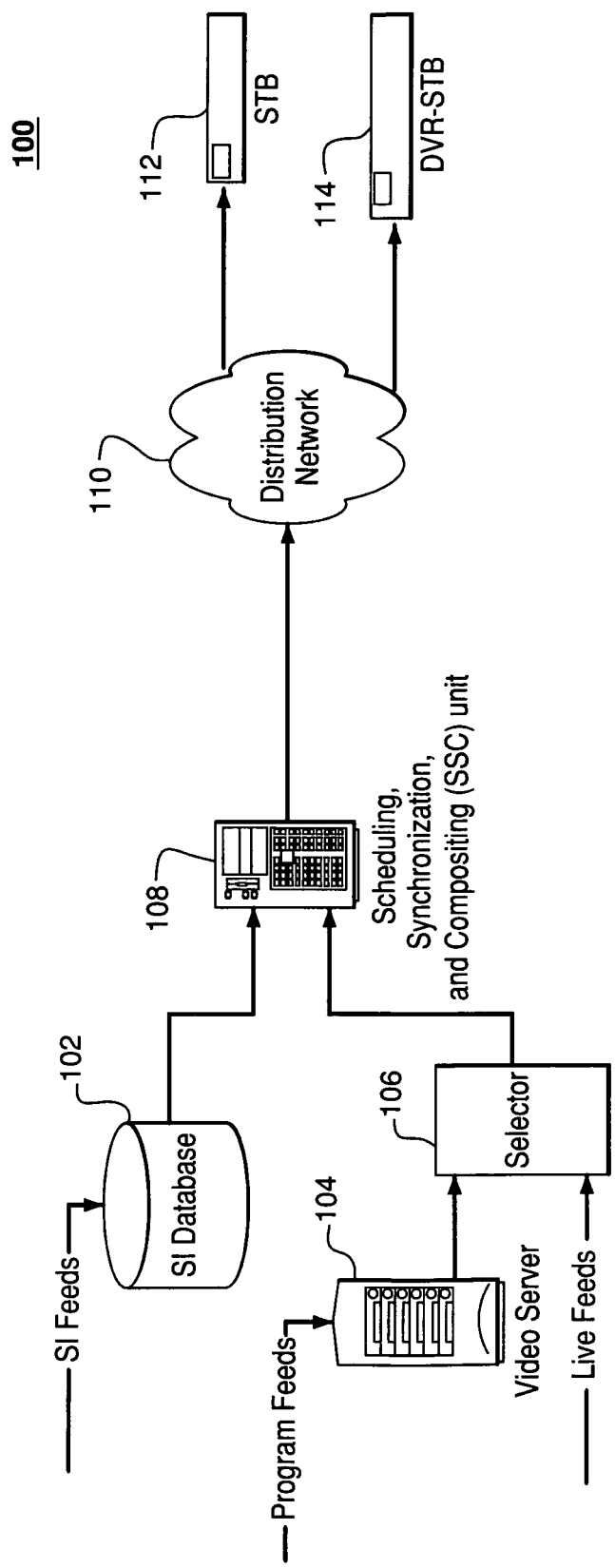
FIG. 1 illustrates exemplary multimedia content delivery (MCDN) network 100 of the prior art.

FIG. 1 illustrates multimedia-content delivery network (MCDN) 100 of the prior art. Network 100 includes supplemental information database 102, video server 104, live/recorded video selector 106, scheduling, synchronization, and compositing (SSC) unit 108, distribution network 110 (e.g., broadcast, cable, satellite, Internet network), conventional one or two-way set-top box (STB) 112, and DVR-enhanced set-top box (DVR-STB) 114.

In operation, supplemental information (e.g., stock prices, sports scores, news stories, and commercials) from multiple sources (e.g., stock exchanges, Internet news services, sports networks, and advertisers) is captured to SI database 102, while program feeds (e.g., syndicated programs from a studio or broadcast network) are stored to video server 104. Outputs from video server 104 and live feeds (e.g., a football game or live news show) are input to selector 106, while, under the control of SSC unit 108, the output of the selector, along with the output of SI database 102 are fed to SSC unit 108. Within SSC unit 108, SI is transformed (e.g., via text-to-graphical conversion) into an appropriate form for overlay onto (e.g., via a keying unit), insertion into (e.g., via a commercial inserter/video splicer), or transport within (e.g., via a transport multiplexor or grooming unit) a program feed. The resulting composite program transport stream, which is output from SSC unit 108, feeds distribution network 110, where the composite stream is distributed to the set-top boxes.

For purposes of discussion, let Tp represent the "present" time. Tp could then be used to represent the time at which compositing (in SSC 108), distribution (via network 110), and reception/decoding/output to a display (at STB 112) is performed. If that is the case, then within conventional STB 112, the composite transport stream is received, decoded, and output to a display also substantially at time Tp. Within DVR-STB 114, the transport stream can also be decoded and output to a display substantially at time Tp, or the transport stream can be stored for later decoding and display at some future time Tf. Alternatively, a transport stream that was previously stored (e.g., at an earlier recording time Tr) can be decoded and displayed at the present time Tp. In the latter case, where DVR-STB 114 is used to decode and display at time Tp a composite program that was stored at an earlier recording time Tr, there can be issues associated with the temporal relevance of the SI. Consider a program that is composited, distributed, and recorded at time Tr and played back by DVR-STB 114 at a later time Tp. Depending on the time-shift, Ts, between time Tr when SI information was composited into the composite program and time Tp when the program is viewed, the SI within the overlays can be old and/or irrelevant.

Real-Time Information Update

Figure 2:
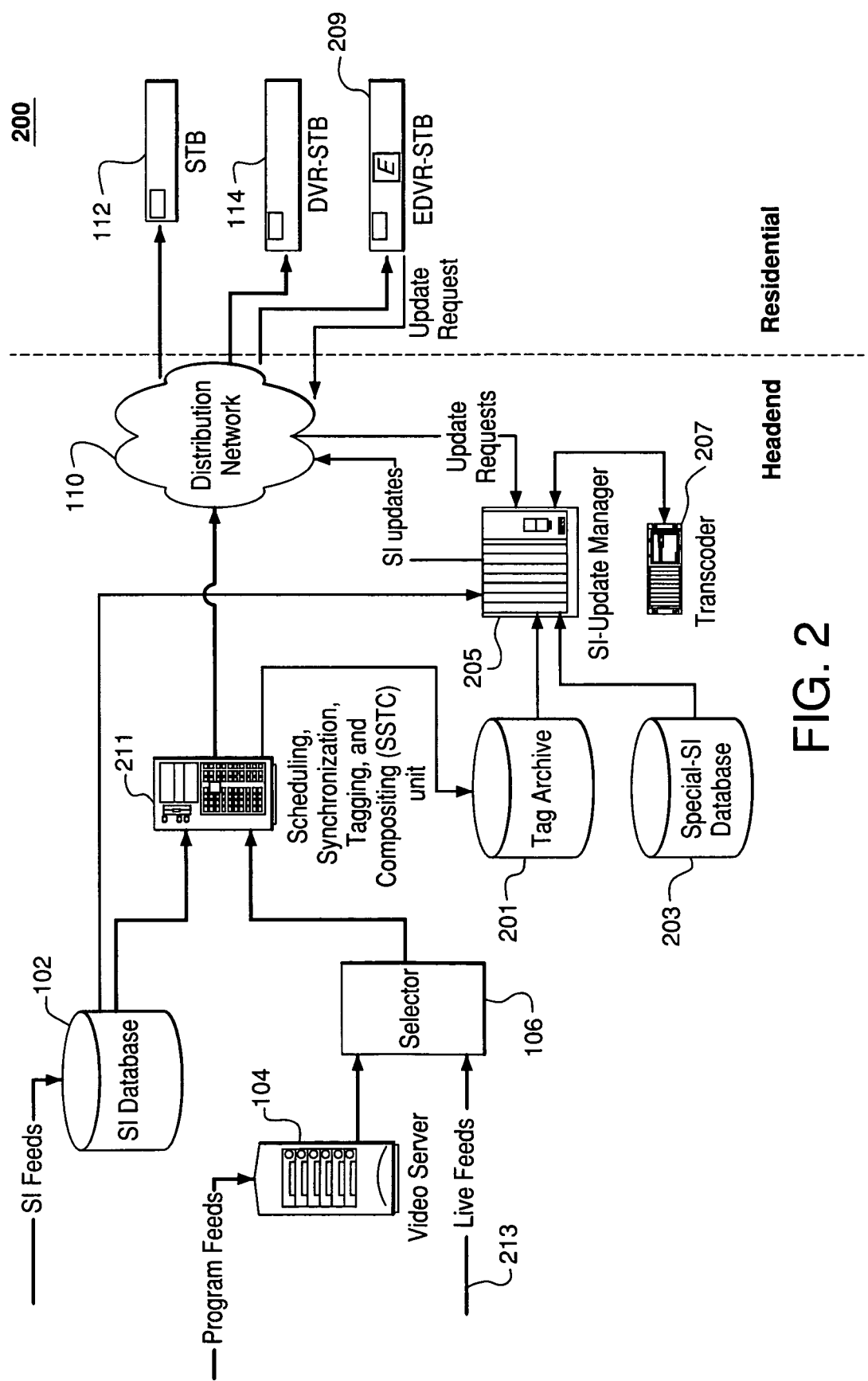
FIG. 2 illustrates updating multimedia content delivery network (UMCDN) 200 according to one embodiment of the present invention.

FIG. 2 illustrates updating multimedia content delivery network (UMCDN) 200 according to one embodiment of the present invention. Like MCDN 100 of FIG. 1, UMCDN 200 includes supplemental-information database 102, video server 104, live/recorded video selector 106, distribution network 110, STB 112, and DVR-STB 114. These elements of FIG. 2 perform substantially as described previously with respect to FIG. 1. UMCDN 200 also includes tag archive 201, special-SI database 203, SI-update manager 205, transcoder 207 and enhanced DVR-STB (EDVR-STB) 209. Additionally, UMCDN 200 includes scheduling, synchronization, tagging, and compositing unit 211 which includes all the functions of SSC 108 of MCDN 100 of the prior art, and additional functions specific to the present invention.

As discussed previously, there are a number of different forms of SI information. In the following discussion, the operation of UMCDN 200 will first be described with respect to spatially differentiated SI. Spatially differentiated SI includes SI that is overlaid on a region or regions of a video display as illustrated by exemplary composite program display 300 of FIG. 3, which composite program display includes video display area 302, sports score crawl area 304, current time and temperature area 306, local advertisement region 308, and disclaimer area 310. As would be understood to one skilled in the art, this discussion applies similarly to SI information that is temporally or logically differentiated from the primary multimedia feed.

In one example of the operation of UMCDN 200, a live football game broadcast is received via live feeds interface 213 and, under the control of SSTC 211, selected by selector 106 to feed SSTC unit 211. Concurrently, also under the control of SSTC 211, supplemental information is drawn from SI database 102.

SSTC 211 manages the layout of the composite display (e.g., which areas of the composite display show video, and which areas display supplemental information) and the sequencing of information overlay on the various areas of the layout over time, and the synchronization of SI with respect to other events (e.g., the synchronization of closed caption and the video stream). SSTC 211 also handles conversion of information to an overlay-compatible format (e.g., font rendering and keying/blending) and management of such functions as scrolling speed. To support live update of time-shifted information, SSTC 211 also creates a "tag" for each distinct area of the composite display and inserts these tags into the composite program stream that the SSTC creates. Each tag includes a small data structure. The data structure can include such information as the location and size of the SI area (e.g., X-Y coordinate of the upper left corner of the area and height and width in lines/pixels), the type of SI/overlay (e.g., current sports scores crawl or time and temperature) carried in the area, the time of presentation (e.g., relative to the program start) of the SI, a program classification (e.g., documentary, news, financial, sports, music, comedy), and a program identifier for the program that carried the SI. The tags are output (e.g., embedded in the vertical blanking interval of an analog program or carried in one or more data PIDs in an MPEG-2 transport stream) by SSTC 211 along with the composite program and delivered via distribution network 110 to STB 112, DVR-STB 114, and EDVR-STB 209. The tagging information is also stored in tag archive 201 for later reference. Note that tag information as well as original SI or replacement SI can be streamed to an EDVR-STB in a number of different formats. These formats include SMIL, HTML, WAP, JAVA, Macromedia FLASH, and OCAP.

Basic One-Way SI Replacement

In a basic SI-replacement embodiment of the present invention, the tag information is ignored by STB 112 and DVR-STB 114. However, each time EDVR-STB 209 records a composite program, it also records the tags that go along with it. Then, when EDVR-STB 209 plays back a program that was recorded earlier, it calculates the timeshift value Ts by subtracting the record time Tr from the present time Tp. If the difference Ts exceeds some specified threshold Tth, then EDVR-STB 209 will seek to replace the (now potentially "stale") tagged SI areas with replacement SI.

Replacement SI can be "fresh" SI that is downloaded in real time, for example, from a special time-shift update (TSU) SI stream that is inserted into the network by the SSTC unit (e.g., carried within a second video or alternative data PID(s) in the transport stream of each present-time feed). In this case, to retrieve the replacement SI, the EDVR-STB will tune to the channel from which it originally recorded the stored composite program, or to a designated TSU SI channel known to the EDVR-STB or conveyed to it in the tag or a configuration table. Once the TSU SI stream is tuned to, TSU SI can be downloaded and used to replace now obsolete SI areas in the program using a cut and fill (e.g., keyer) or compositing engine (e.g., MPEG-4 visual compositing engine) within the EDVR-STB. The replacement SI can include actual video objects, in which case they are composited or windowed onto the composite display, or the SI can be in the form of text data that is then rendered within the graphics engine of the EDVR-STB.

Replacement SI can also be non-time-sensitive (NTS) SI (e.g., channel promotion material or special advertising SI), in which case, it can be delivered at any point in time (including the present) to the EDVR-STB, by any of a number of different transports including IP network, inband or out-of-band transport on a cable or satellite network, and telephone modem. Replacement SI can also be carried within the transport stream of the composite program itself when it is delivered at recording time Tr. Replacement SI can also corresponding to original video content that was originally affected (e.g., overwritten) by the original SI.

Figure 3:
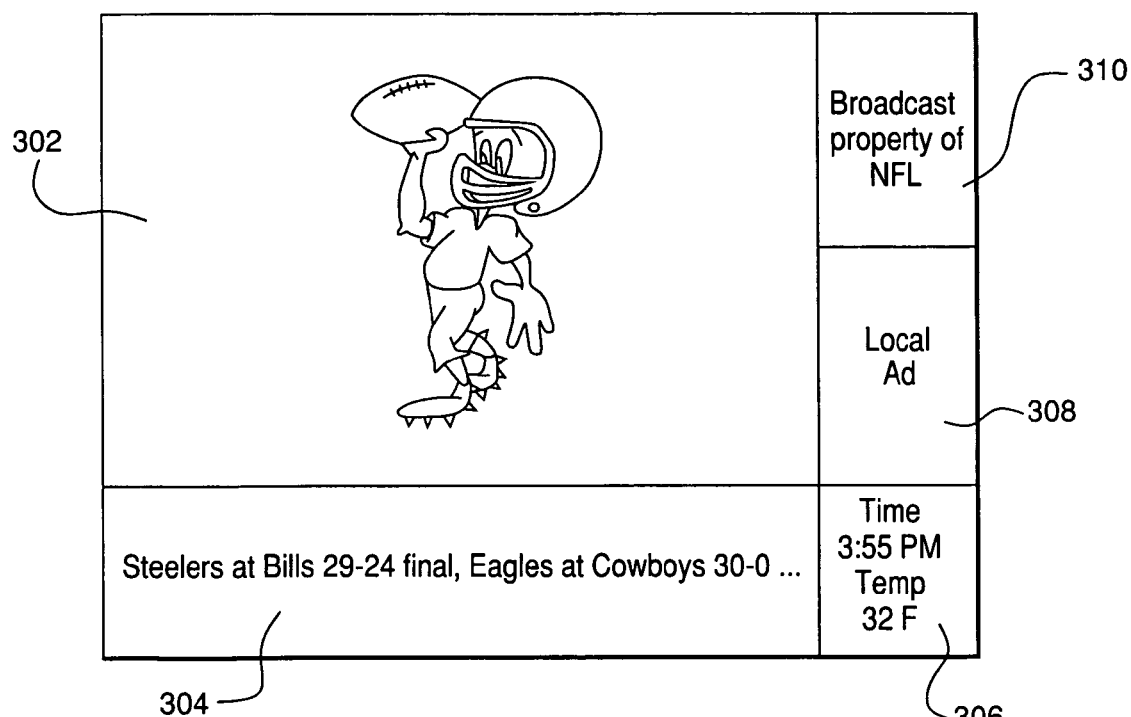
FIG. 3 illustrates exemplary composite program display 300.

Consider the time and temperature SI area 306 of the composite display of FIG. 3. Clearly time and temperature represents SI information that can become stale. This screen area represents prime screen real-estate that can be filled with non-time-sensitive advertisements in the case of NTS replacement SI or by the present time and temperature in the case of TSU replacement SI. The league scores area 304 also represents somewhat time-sensitive SI within the recorded program. This area can also be updated with either TSU SI or NTS SI.

As another example, screen area 310, which represents a text overlay describing copyrights associated with the primary video feed, might be associated with a tag that indicates "do not replace overlay, even if delayed." Conversely, the tag for an advertisement overlay (e.g., local advertisement area 308 of FIG. 3) might indicate "this graphics is obsolete if not viewed in real time." Alternatively, or additionally, a program-global tag might state that display of recorded overlays is permitted only when the program is viewed substantially when aired. In other words, the tag could be used to prevent not just replacement overlays, but all overlays, from being displayed when the recorded program is delayed longer than a specified time. This latter restriction can be used, where desired, to preserve the integrity or quality of certain programs, or to prevent the creation of what could be considered by some to be a derivative work of the original consisting of the original programming combined with some alternative overlay. In one or more embodiments, a hierarchy of rules is implemented based on agreement among the various advertising, content development, viewer, and content distribution parties.

In one or more embodiments of the present invention, any of the SI areas can be replaced as a function of one or more of user, content provider, and service provider preferences (potentially subject to some constraints based on copyright considerations). In such embodiments, "power-users" of the EDVR-STB are provided with a preferences dialog screen similar to that illustrated by dialog screen 400 of FIG. 4.

Figure 4:
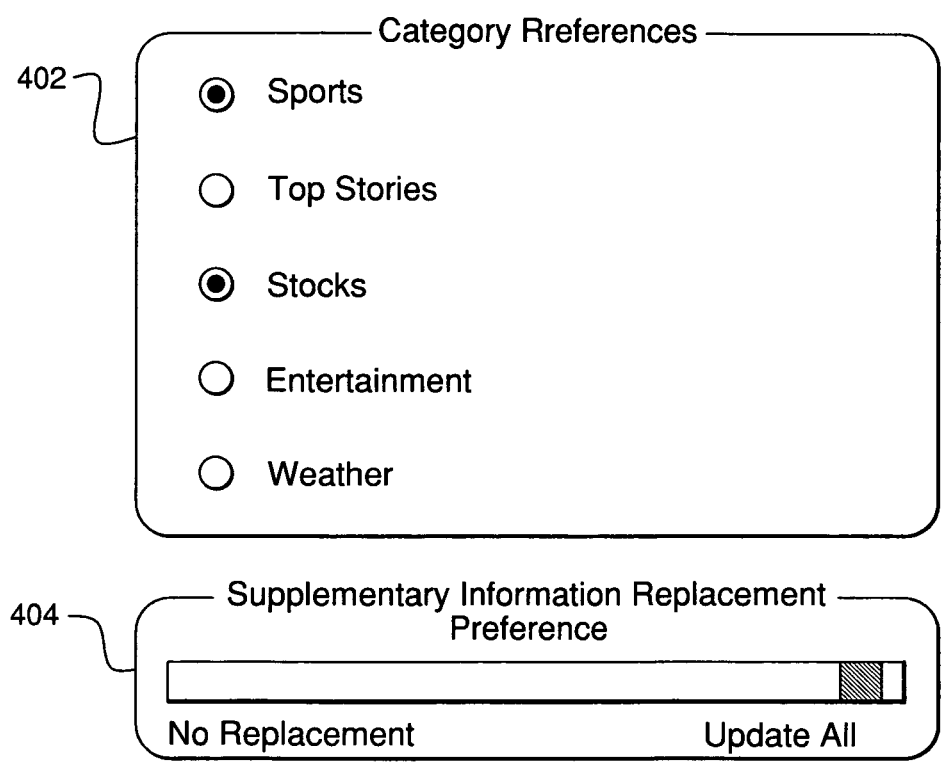
FIG. 4 illustrates exemplary preferences dialog screen 400 according to one embodiment of the present invention.

FIG. 4 includes menu 402 of categories of updated SI, from which a user can select the types of SI that he would like to view with his time-shifted programs, as well as a replacement preferences slider control 404, with which a user can select to what extent he prefers to view updated SI versus originally-aired SI. In the example illustrated, the categories of sports and stocks are illustrated as selected, and the replacement preferences slider control is depicted as indicating a strong preference for SI replacement.

Figure 5:
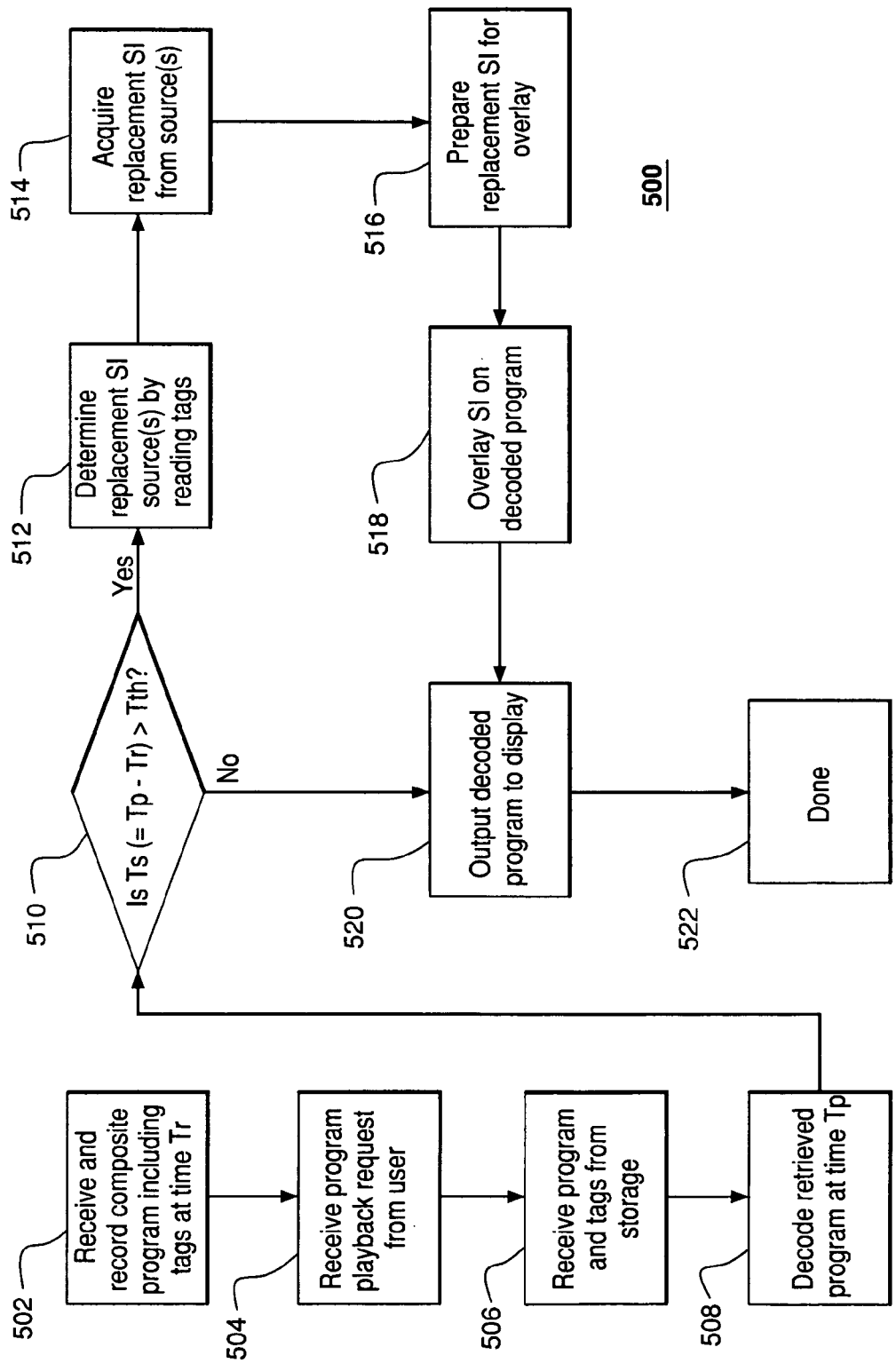
FIG. 5 illustrates exemplary process 500 executed by an EDVR-STB of the present invention in support of basic one-way SI replacement.

FIG. 5 illustrates exemplary process 500 executed by an EDVR-STB of the present invention in support of basic one-way SI replacement. In step 502, the EDVR-STB receives and records (potentially at a user's request) a composite program, along with associated tags, substantially at time Tr. In step 504, the EDVR-STB receives a playback request for the program from the EDVR user. Then, in step 506, the EDVR retrieves the program and any associated tags from storage and in step 508, the EDVR decodes the retrieved program, including the original overlays substantially at time Tp.

In step 510, a test is performed to determine if the timeshift Ts (i.e., the time between when the program is played back Tp and the time it was recorded Tr) represents a shift in time that is significant, for example, greater than some threshold delay Tth. Note that Tth (e.g., three hours) can be a fixed parameter in the EDVR set-top or it can be a parameter that is downloaded to the box. Tth can be global to all overlays in the program or there can be a Tth parameter for each overlay. Additionally, Tth can be global to all programs, or global to one program, or global to one or more classes of overlays or programs. In some embodiments, the threshold is programmable by the network operator and/or by the user of the EDVR. In one or more embodiments, the threshold is downloaded along with the program and/or is unique and/or part of each tag.

If the timeshift is significant, then in step 512, the source or sources (note that there can be a different source, such as an inband PID stream, for each SI update) for the replacement SI is determined by reading the tags associated with the retrieved program. Then, in step 514, the actual replacement SI is retrieved from the source(s). The replacement SI is then prepared for overlay in step 516, and, in step 518, the updated SI is overlaid onto associated overlay areas within the decoded composite program. Next, or if the test of step 510 failed, the decoded and potentially overlay-updated program is output to a display in step 520, and in step 522, the process concludes.

Two-Way or Interactive SI Updates

An EDVR-STB that includes two-way/interactive capability associated with tags and/or overlays includes all the functionality of the basic one-way EDVR-STB as previously described, plus additional functionality as described below.

Referring again to FIG. 2, in various embodiments of the present invention, an EDVR-STB includes a two-way connection (e.g., Internet connection via cable modem or dial-up) to a real-time update manager (e.g., SI-update manager 205). In these embodiments, SI tags can be sent to the SI-update manager from an EDVR-STB and used as reference handles to SI data. In response to receiving these tags, the update manager provides SI updates or overlays directly to the EDVR-STB on a tag-specific basis. In this way, SI updates can be tailored both to the relative time of playback of the program with respect to the time of recording, as well as the content of the program that is being played back.

In one or more of these two-way/interactive embodiments, SSTC unit 211 is optionally interfaced to tag archive 201 which in turn is connected to SI-update manager 205, which in turn has access to SI database 102. Tag archive 201 stores tags and overlay information in archival format. In such embodiments, a tag can be as basic as a unique overlay identifier that is used by the SI-update manager to index into the tag archive. Information is retrieved from the tag archive that includes the time that the tag/overlay/program was sent, the program associated with the tag, the overlay location within the program (e.g., spatial, temporal, or logical location), the overlay type, program type, and/or other identifying information. This information can be used by the SI-update manager to identify appropriate replacement SI that the manager can then retrieve (e.g., from SI database 102 or optional "special" SI database 203) and transmit to the EDVR-STB. Special-SI database 203 is used to store various forms and types of replacement SI for the EDVR-STB (e.g., generic advertisements for USB storage expansion for the EDVR-STB) that may be relevant to various programs on playback, but that were not part of earlier or current SI transmissions stored in SI database 102.

In certain embodiments of the present invention, SI-update manager 205 communicates with transcoder 207. In these embodiments, SI information retrieved from one or more sources (e.g., special-SI database 203) is passed to transcoder 207 to be transcoded from its retrieved format to a format suitable to the requirements of the EDVR-STB for which the SI update is destined. These formats include, without limitation, OCAP, HTML, WAP, JAVA, macromedia FLASH, and SMIL.

In one or more embodiments of the present invention, tag-related information is passed by the EDVR-STB securely via the SI-update manager to the content provider who created the program that is being played back by the EDVR-STB. In these embodiments, the content provider retains tighter control of replacement SI and is able to deliver SI updates that are approved for the content produced by the content provider.

For example, to prevent unauthorized or malicious SI from entering into the system (e.g., via hacking), each tag can be authenticated and encrypted by an originator of the tag (e.g., the SI creator, the multimedia content creator or studio, a secure server, or a secure version of either the SSTC or the SI-update manager). Then, to retrieve updated SI, the tag is passed securely from the EDVR-STB to the originator, where the SI updates are retrieved, and optionally authenticated and encrypted before being transmitted to the EDVR-STB. In the latter case, the EDVR-STB is equipped with the ability to authenticate the SI originator and decrypt the updated SI before presenting it along with the primary multimedia content during playback.

Figure 6:
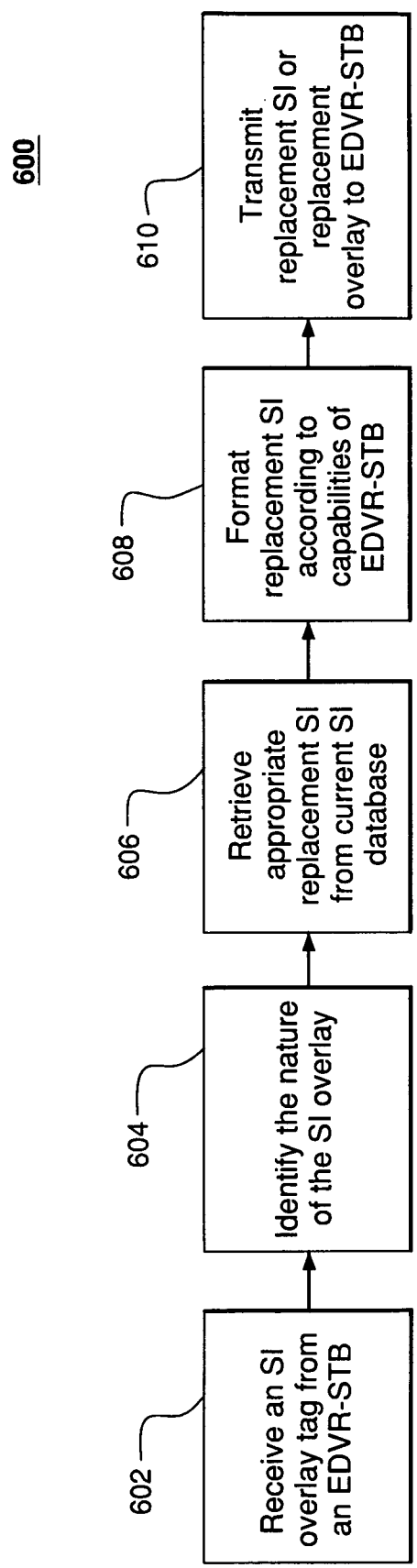
FIG. 6 illustrates an exemplary process 600 executed by SI-update manager 205 of FIG. 2 with respect to updating the SI in a two-way EDVR-STB, according to the present invention.

FIG. 6 illustrates an exemplary process 600 executed by SI-update manager 205 of FIG. 2 with respect to updating the SI in a two-way EDVR-STB, according to the present invention.

In step 602, the SI update manager receives an SI overlay tag from an EDVR-STB. Next, in step 604, the SI update manager determines the nature (e.g., associated program, original airing time, location, and size) of the SI overlay. For example, the overlay could be a 10-line by 320-pixel crawling stock ticker focused on technology stocks, or the overlay could be a full-screen, 30 frames-per-second video commercial (e.g., inserted temporally into the original program) for soap manufactured by a particular manufacturer.

An appropriate replacement for the stock ticker could be a similarly sized technology stock ticker crawl updated with the current stock prices, or, if the playback time Tp is after the stock market has closed for the day, a ticker crawl conveying the market close values for each stock can be substituted.

In the case of the soap commercial, an appropriate replacement might be a special "no replace" message. This might be an appropriate tag response to the EDVR-STB based on the non-time-sensitive nature of the soap commercial, or a reflection of a limited bandwidth on the path from the update manager to the EDVR-STB that would prevent the real-time provision of a replacement video clip. In the latter case, alternative methods could be employed for getting the commercial into the EDVR-STB. These include trickle-feeding the commercial in advance of its playback time or responding to the overlay tag with a channel identifier (or a program stream within a channel in the case of an MPEG-2 feed) and a time reference so the EDVR-STB can tune to the channel and download the commercial, storing it for later playback.

Returning to FIG. 6, the SI update manager retrieves appropriate replacement SI from the current SI database (step 606), formats the replacement SI according to the capabilities of the EDVR-STB (step 608), and transmits the replacement SI or replacement overlay to the EDVR-STB (step 610).

Though one or more embodiments of the present invention have been described with reference to a specific functionally partitioned architecture illustrated by FIG. 2, the invention may be implemented in various ways and the functions can be partitioned among the physical elements of the system and set-tops in alternative ways as would be understood to one skilled in the art. Specifically, some functions of the SSTC can be performed by products (e.g., Louth automation servers, Pinnacle Deko-Cast graphics and video overlay units, and EEG Enterprises EN-470 VBI encoders) combined with new control and database elements such as application-specific servers and RAID arrays configured and programmed to support the concepts of the present invention.

Overlay and multimedia content streams can be analog or digital or a combination of both and conveyed in either analog or digital transport streams.

"Presenting," as used herein, is the process of overlaying onto (for spatially differentiated SI), inserting into (for temporally differentiated SI), or multiplexing into (for logically differentiated SI) SI a composite multimedia content feed. Note that logically differentiated SI can include executable applications (e.g., OCAP applications) and/or data for those applications. In these cases, presenting is understood to mean making those applications available for execution or the data for those applications available for the applications to read and act upon. For example, a composite multimedia content stream might include a video program, and an application that reads a stock ticker database selects those that a user has designated via a preferences dialog to be of interest to him and displays those stock tickers across the bottom of the display. Presenting, in this example, at the headend side, would correspond to the process of multiplexing the application and potentially the data into the composite multimedia content stream along with the video. On the EDVR side, presenting corresponds to the process of making the application and the data available.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims are recited in a particular sequence, unless the claim recitations otherwise imply a particular sequence for implementing some or all of those steps, those steps are not necessarily intended to be limited to being implemented in that particular sequence.

What is claimed is:
1. A computer-implemented method comprising:
  recording, at a recording time, multimedia content comprising first primary feed and first original supplemental information (SI);
  retrieving, at a playback time, the recorded multimedia content;
  replacing the first original SI with first replacement SI to form updated multimedia content comprising the first primary feed and the first replacement SI, wherein:
  a tag is associated with the first original SI;

the tag is secured by an originator of the tag prior to being recorded along with the first original SI; and replacing the first original SI with the first replacement SI comprises:
securely transmitting the tag to the originator of the tag via a network; and
securely receiving the first replacement SI from the network in response to the secure transmittal of the tag to the originator of the tag; and presenting the updated multimedia content comprising the first replacement SI.

2. The method of claim 1, wherein the first original SI is spatially differentiated from the first primary feed in the multimedia content.

3. The method of claim 1, wherein the first original SI is temporally differentiated from the first primary feed in the multimedia content.

4. The method of claim 1, wherein:
the originator of the tag is a content provider;
the content provider created at least one of the first primary feed and first original SI;
the first replacement SI is received from the content provider.

5. The method of claim 1, wherein:
securing the tag comprises authenticating and encrypting the tag; and
securely receiving the first replacement SI comprises authenticating an originator of the first replacement SI and decrypting the replacement SI.

* * * * *